Patented Sept. 11, 1951

2,567,237

UNITED STATES PATENT OFFICE 2,567,237

AMIDES OF 9,10-EPOXYSTEARIC ACID

John T. Scanlan, Daniel Swern, and Edward T. Roe, Philadelphia, Pa., assignors to the United States of America as represented by the Secretary of Agriculture No Drawing. Application May 20, 1949, Serial No. 94,532

3 Claims. (Cl. 260—348)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to amides of 9,10-epoxystearic acid and has among its objects the provision of such amides and methods for their preparation.

We have found that amides of 9,10-epoxystearic acid are obtained by reacting the corresponding amides of oleic acid with peracetic acid in glacial acetic acid solution.

The method of this invention is applicable to the production of 9,10-epoxystearamide and of the N-substituted 9,10-epoxystearamides, wherein the N-substituent may be an organic radical such as an alkyl, a hydroxyalkyl, an acyl, or an aryl group. These compounds may be represented by the formula

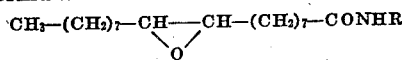

wherein R is hydrogen and an organic radical such as mentioned above. The products of this invention are useful as constituents of high-melting point waxes and as intermediates in the production of wetting agents, plastics and other synthetic chemicals.

The following examples are illustrative of the invention:

To a well-stirred mixture of 18.3 g. (0.05 mole) of N-(n-hexyl) oleamide and 10 ml. of glacial acetic acid at 20° C., 55 ml. of approximately 1 M peracetic acid solution (0.06 mole) was added in about three and one-half minutes. The temperature was maintained at about 20° to 25° C. by external cooling. After about four hours 85-90% of the calculated quantity of peracetic acid had been consumed, and the reaction mixture was then poured into about 500 ml. of ice water. Upon standing, a granular solid separated, which was filtered off and washed with several portions of cold water. After being air dried, this crude N-(n-hexyl)-9,10-epoxystearamide, M. P. 62.0°-63.5° C., weighed 18.6 g. Recrystallization to constant melting point from acetone at 25° C. resulted in a 49% yield of N-(n-hexyl)-9,10-epoxystearamide, M. P. 66.0°-66.5° C. The oxirane oxygen content determined by the method of Swern et al. (1947, Anal. Chem. 19, 414) was 4.14%.

Using the procedure of the foregoing example, and replacing the N-(n-hexyl) oleamide by equivalent amounts of other amides of oleic acid having the values of R indicated below as the N-substituent, the following amides of 9,10-epoxystearic acid, as represented by the formula

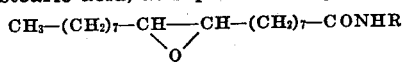

were prepared:

| R | M. P. of Amide |
|---|---|
| | °C. |
| Hydrogen | 94.0 |
| Methyl | 65.5-66.0 |
| n-Hexyl | 66.0-66.5 |
| n-Decyl | 75.0-75.5 |
| n-Dodecyl | 78.5-79.0 |
| Phenyl | 83.0-83.5 |
| alpha-Naphthyl | 81.0-81.5 |
| beta-Hydroxyethyl | 81.5-82.0 |
| Acetyl | 74.0-75.0 |

N-substituted 9,10-epoxystearamides, containing as the N-substituent other alkyl, hydroxyalkyl, aryl and acyl groups, are obtained in an analogous manner from the corresponding N-substituted oleamide, such as tolyl, beta-naphthyl, hydroxymethyl, hydroxypropyl, propionyl or butyryl oleamide.

Best results are usually obtained on conducting the reaction at about 20°-30° C.; at lower temperatures, down to just above the freezing point of the solvent, the rate of reaction decreases with the temperature; above about 40° C. the rate of ring opening becomes greater than the rate of epoxidation, and at 65°-100° C., in the presence of acetic acid, quantitative opening of the oxirane ring occurs within approximately one hour.

The method of this invention is also applicable to the production of the corresponding epoxy amides from the amides of other monoethenoic acids, such as the amides of elaidic, ricinoleic, petroselinic, petroselaidic, myristoleic, palmitoleic, and vaccenic acids and any of their isomers.

We claim:
1. 9,10-epoxystearamide having the formula

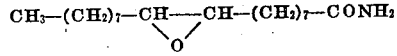

2. A process of preparing an amide of 9,10-epoxystearic acid containing at least one hydrogen bonded to the nitrogen atom of the amide grouping comprising reacting the corresponding amide of oleic acid with peracetic acid in glacial acetic acid solution.

3. A process of preparing 9,10-epoxystearamide comprising reacting oleamide with peracetic acid in glacial acetic acid solution.

JOHN T. SCANLAN.
DANIEL SWERN.
EDWARD T. ROE.

REFERENCES CITED

The following references are of record in the file of this patent:

UNITED STATES PATENTS

| Number | Name | Date |
|---|---|---|
| 2,458,484 | Terry | Jan. 4, 1949 |
| 2,493,090 | Shelton | Jan. 3, 1950 |

OTHER REFERENCES

Findley: J. Amer. Chem. Soc., March 1945, pp. 412-414.